Sept. 27, 1966  J. B. STECK ET AL  3,275,091
TRACTION DEVICE FOR VEHICLES
Filed Aug. 20, 1964
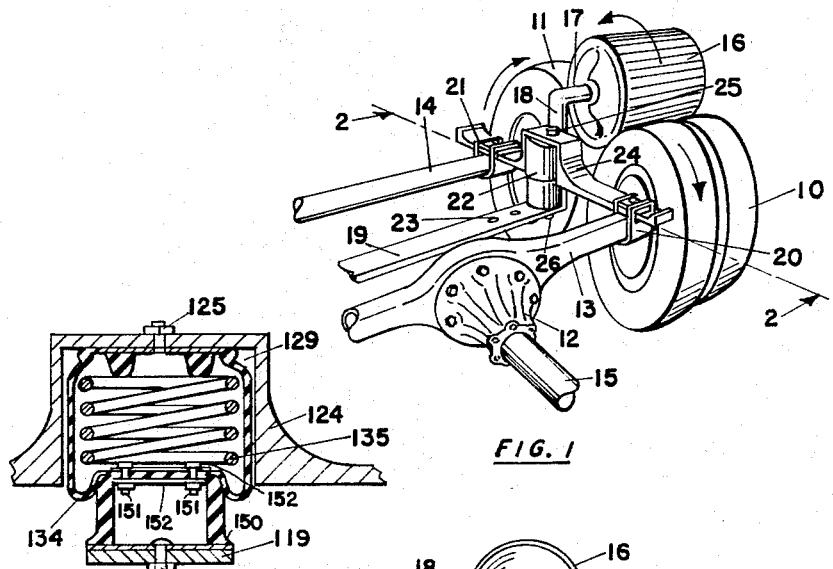
FIG. 1
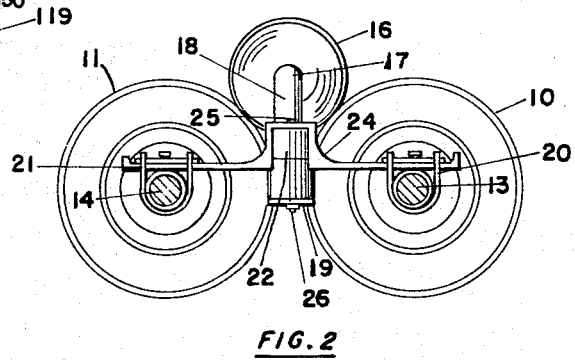
FIG. 5
FIG. 2
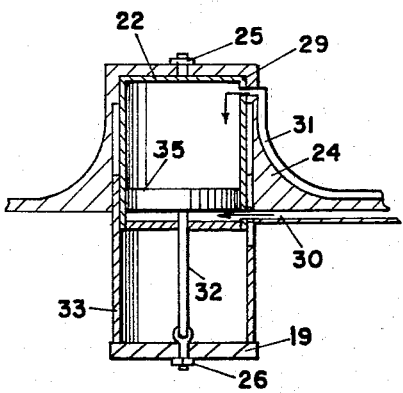
FIG. 3
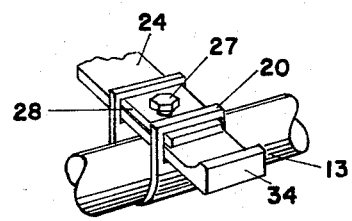
FIG. 4
INVENTORS
JOSEPH B. STECK
DONALD H. SLATER
BY
Charles L. Lovercheck
attorney

United States Patent Office 3,275,091
Patented Sept. 27, 1966

3,275,091
TRACTION DEVICE FOR VEHICLES
Joseph B. Steck, R.D. 1, Hadley, Pa., and Donald H. Slater, R.D. 1, Fredonia, Pa.
Filed Aug. 20, 1964, Ser. No. 390,848
2 Claims. (Cl. 180—22)

This invention relates to vehicle drives and more particularly to a traction device for trucks having extension or tandem wheels on the tractor to help support the load. In this type of vehicle the load is proportioned so that the drive wheels carry an equal load. It may be found that sometimes the drive wheels do not have sufficient traction on wet pavement, mud, or the like.

An object of the invention is to provide a device which will provide additional traction by affixing an idler cylinder which transmits power from the drive wheels to the idler wheels of a tandem vehicle.

Another object of the invention is to provide a drive for the rear idler wheels of a tandem vehicle.

Another object of the invention is to provide additional drice which may be adjusted to fit trucks with extension wheels.

Another object of the invention is to provide an optional drive that may be quickly actuated from the cab of a truck by a hydraulic system to drive idler tandem wheels thereof.

Still a further object of the invention is to provide a traction device which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is an isometric view of the drive according to the invention on a truck;

FIG. 2 is a cross sectional view of the drive;

FIG. 3 is an enlarged view of an actuating device;

FIG. 4 is another view of an actuating device; and

FIG. 5 is a detail view of a part of the device.

Now with more particular reference to the drawing, FIG. 1 shows the traction idler 16 in driving relationship with driving wheels 10 and idler wheels 11. As power is transmitted through drive shaft 15 to differential enclosed in differential housing 12 and on to axle 13 in the housing to drive wheels 10, it further transmits power by friction contact to traction idler 16. The traction idler then transfers this power by friction to idler wheels 11. The raising and lowering of the traction idler 16 is done by the hydraulic cylinder 22 which is attached to the cavity 29 provided in the inverted T bar 24 being spaced equally between driving wheels 10 and idler wheels 11. The inverted bar forms a simple beam supported on axles 13 and 14.

The piston 35 of hydraulic cylinder 22 is attached to horizontal bar 19 by rod 32 with tightening bolt 26. The bar 19 has additional adjustment holes 23 therein for optional spacing due to space limitations in different vehicles.

The horizontal bar 19 has an upwardly inclined vertical support bracket 18 which has a horizontal shaft 17 attached to receive traction idler 16. The top of the cylinder 22 is supported in cavity 29 by the top cylinder bolt 25.

In FIG. 2 the adjustable brackets 20 and 21 are shown attached to the axles 13 and 14 with limited sliding at the ends thereof. The brackets 20 and 21 are made adjustable so they may be attached to trucks with different dual wheel spacing relationships so that there can be relative motion when the wheels roll over uneven surfaces. The bar 24 may slide in bracket 20 thereby allowing more mobility to wheels 10 and 11 when in motion. The bracket 20 will not slide off due to the flanged end 34 of T bar 24.

The brackets 20 and 21 are U shaped with cut out portions in the top to receive the T bar 24. A top plate 28 is placed thereon in the slot provided in the brackets. A tightening screw 27 is threadably attached to top plate 28 for the purpose of holding the bracket 20 in place with the axle 13 and bar 24 so they will not rattle, yet may slide as the wheels move up and down. The hydraulic cylinder 22 which could also be actuated by air is best shown in FIG. 3 with hydraulic line 31 attached to the top of the cylinder. Therefore, when the oil is pumped in, the piston 35 which is attached to horizontal bar 19 by means of piston rod 32 is forced down thereby causing traction idler 16 to engage with wheels 10 and 11. When oil is pumped into line 30 the piston 35 will be forced up thereby disengaging traction idler 16 from wheels 10 and 11. A bottom cylinder 33 is telescopably attached to cylinder 22. This acts as a dust shield. The line 30 is connected to the lower end of cylinder 22 by a nipple which extends through an open ended longitudinally extending slot in the side of cylinder 33. Thus, cylinder 33 can reciprocate relative to cylinder 22 and the slot in the cylinder 33 receives the nipple as indicated. A hydraulic control will be provided on the dashboard for control of traction idler 16.

Another embodiment is shown in FIG. 5 whereby an air suspension bag member 134 in the form of an air bag is used in place of the hydraulic cylinder. The air suspension member is received in opening 129 of the T bar 124. It is attached to a relatively rigid mounting member 150 by bolts 151 and plates 152. It will be held in position by bolt 125 in the top of the T bar and bolt 126 which is supported on horizontal bar 119. As air is forced into the bag member 134, the bar 119 will be forced down thereby forcing the idler wheel 16 in engagement with driving wheels 10 and idler wheels 11. The tension spring 135 is disposed inside the air suspension bag member. It will stretch when the air suspension bag member is inflated and will retract when the air is released from air suspension bag member 134. The spring 135 acts as a return spring for the suspension bag member 134 whereby it lifts the idler out of engagement with the drive wheels.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A drive for a vehicle having ground engaging rear drive wheels and ground engaging idler load supporting wheels,
   spaced parallel load supporting transversely extending rear axles on said truck comprising a drive axle and an idler axle,
   said drive wheels being disposed on said drive axle and said idler wheels being disposed on said idler axle,
   two horizontal bars each supported at one side of said truck,
   one end of each said bar being supported on said idler axle and the other end of each said bar being supported on said drive axle,
   a fluid actuated member attached to an intermediate part of each said bar, a bracket supported on each said fluid actuated member,
a link on each said bracket rotatably receiving a traction idler,
said bracket being urged downwardly by said fluid actuated member when said fluid actuated member is actuated, moving said traction idler into driving engagement with said idler wheels and said drive wheels.

2. The drive recited in claim 1 wherein
said bars each have an inverted T-shaped member thereon open at the bottom,
said T-shaped member receiving said actuated member,
said actuated member being in the form of an air bag with a flexible bag having one end attached to said bar and the other end attached to a relatively rigid member,
said relatively rigid member being adapted to move into said flexible bag,
spring means in said bag urging said rigid member into said bag,
said bag being adapted to receive said air to extend said bag to force said bar down and to force said idler into engagement with said drive and idler wheels.

References Cited by the Examiner

UNITED STATES PATENTS

| | | | |
|---|---|---|---|
| 1,897,944 | 2/1933 | Carter | 180—22 |
| 2,717,654 | 9/1955 | Anderson | 180—22 |
| 2,861,643 | 11/1958 | Wald et al. | 180—74 |

A. HARRY LEVY, *Primary Examiner.*